United States Patent [19]
Burrill et al.

[11] Patent Number: 5,469,631
[45] Date of Patent: Nov. 28, 1995

[54] AIR BUBBLE FREE COMPASS AND METHOD OF MANUFACTURING SAME

[75] Inventors: James T. Burrill, Peabody; William N. Anastos, Belmont, both of Mass.

[73] Assignee: Rule Industries Inc., Burlington, Mass.

[21] Appl. No.: 334,569

[22] Filed: Nov. 4, 1994

[51] Int. Cl.⁶ ................................................. G01C 17/08
[52] U.S. Cl. ................................................ 33/364; 33/346
[58] Field of Search ............................. 33/346, 364, 396

[56] References Cited

U.S. PATENT DOCUMENTS

| | | | |
|---|---|---|---|
| 1,491,593 | 4/1924 | Eriksen | 33/364 |
| 1,828,194 | 10/1931 | Lietz | 33/364 |
| 2,019,411 | 10/1935 | Hassel | 33/364 |
| 2,136,970 | 11/1938 | Ekeberg | 33/364 |
| 2,336,789 | 12/1943 | Jonsson | 33/364 |
| 4,004,348 | 1/1977 | Fowler et al. | 33/364 |
| 4,236,316 | 12/1980 | Suzuki | 33/364 |
| 4,930,224 | 6/1990 | LeBlanc | 33/364 |

FOREIGN PATENT DOCUMENTS

| | | | |
|---|---|---|---|
| 158060 | 1/1905 | Germany | 33/364 |
| 95398 | 4/1939 | Sweden | 33/364 |

*Primary Examiner*—William A. Cuchlinski, Jr.
*Assistant Examiner*—G. Bradley Bennett
*Attorney, Agent, or Firm*—Iandiorio & Teska

[57] ABSTRACT

A method of preventing air bubbles in a compass equipped with fluid expansion capability, wherein a compass unit is assembled with a fluid expansion diaphragm; the compass unit is filled with fluid expanding the diaphragm, and sealed while maintaining the diaphragm in its expanded state for preventing air bubbles in reduced pressure and/or reduced temperature conditions, without significantly changing the basic structure of the compass.

5 Claims, 2 Drawing Sheets

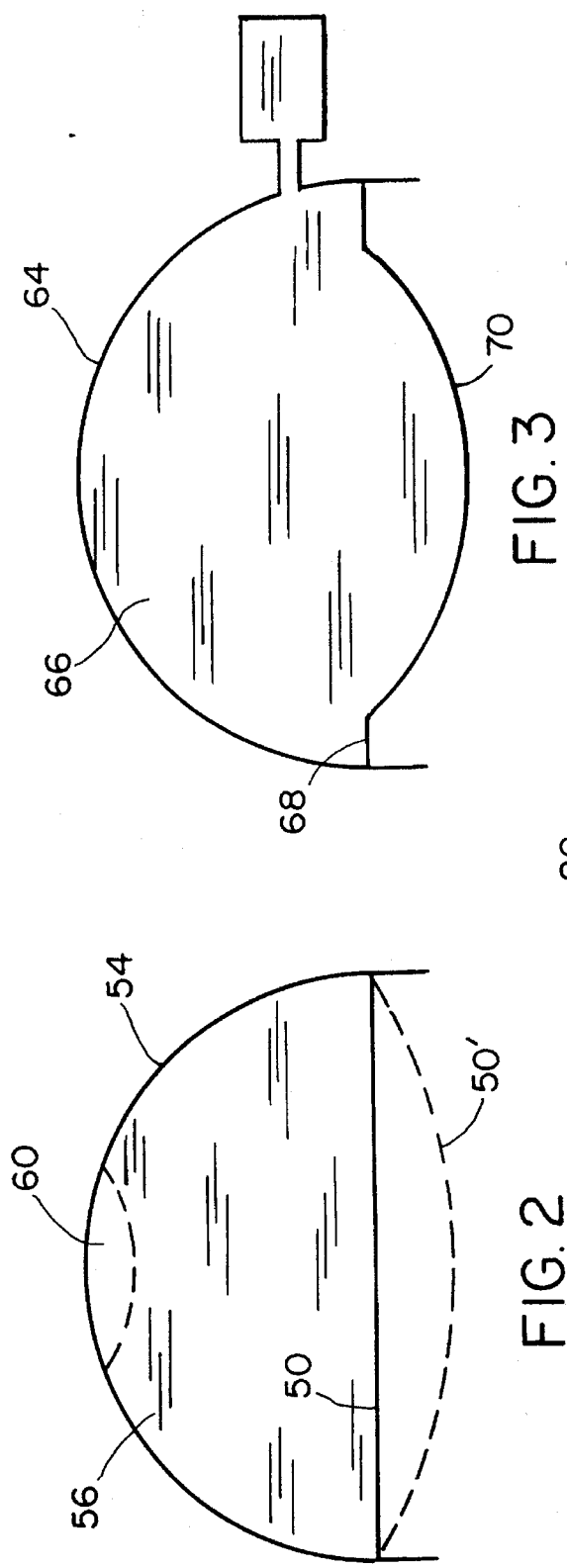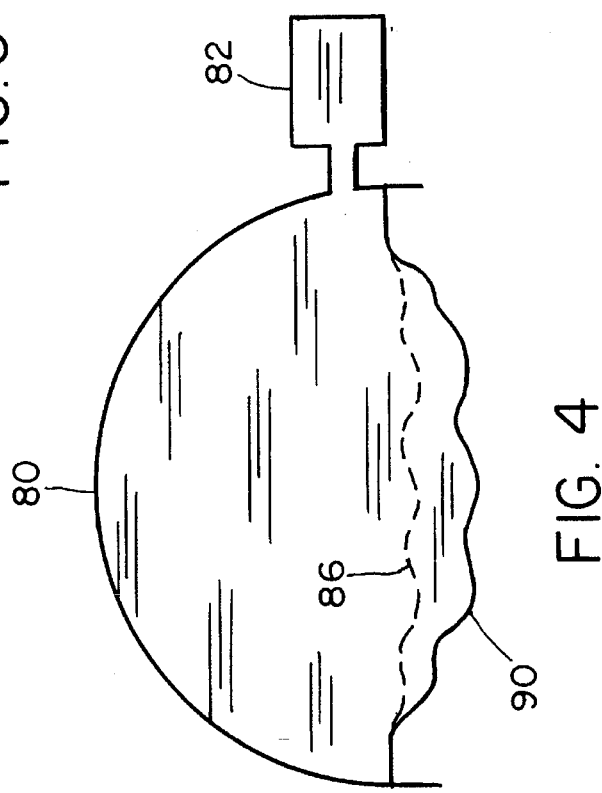

5,469,631

AIR BUBBLE FREE COMPASS AND METHOD OF MANUFACTURING SAME

FIELD OF INVENTION

This invention relates to an air bubble free compass.

BACKGROUND OF INVENTION

Some compasses are designed with a housing which includes a neoprene expansion diaphragm that allows for expansion of the damping oil when the compass is subjected to heat which can occur when the compass is in the sun on the bridge of a ship. The diaphragm expands and contracts maintaining proper fluid pressure in the compass unit.

But in high altitude and/or low temperature conditions, air bubbles can still form in the compass. At high altitude conditions, the pressure outside the compass is reduced and therefore the diaphragm expands outward. When this happens, the volume inside the compass unit is increased and air is released from the oil creating an air bubble at the top of the upper compass bowl which may interfere with the ability to accurately read the compass heading and is cosmetically unappealing. It has also been found that air bubbles will form between the time the compass units are manufactured and sent to distributors and/or retailers.

Others have attempted to reduce or eliminate the formation of air bubbles with some apparent success. Johnson, for example, in U.S. Pat. No. 2,336,789, discloses a compass structure designed to prevent air bubble formation in the compass box. Included in the oil-filled compass box are hermetically sealed, gas filled, flexible tubes which contract and expand in response to increases and decreases in external pressure. Erickson, U.S. Pat. No. 1,491,593 discloses means, such as a compensating pocket within the compass housing which includes a flexible diaphragm that is free to flex in either direction in accordance with varying pressures exerted thereon and is therefore free to respond to the expansion or contraction of liquid within the compass bowl; the body of air or gas below the diaphragm acts to cushion movement of the diaphragm. Ekeberg, U.S. Pat. No. 2,136,970, discloses a compass which adjusts in response to temperature variations to prevent the formation of "vesicles" or leakage. The compass chamber is divided by a resilient aluminum plate into two sub-chambers. Both chambers are filled with oil under a vacuum and the aluminum plate adjusts itself to any changes in volume of the enclosed liquid caused by variations in temperature. Fowler, U.S. Pat. No. 4,004,348, discloses a housing surrounding a complete magnetic compass. The housing includes one resilient portion and is filled with damping fluid under pressure to provide an internal pressure higher than atmospheric. In this way, when the housing is subjected to high external pressures, the inner and outer pressure are equalized thereby minimizing the differential pressure on the housing itself. The focus of this invention is not the prevention of air bubbles, but the elimination of high strength materials for the compass housing. See column 1, lines 23–36.

Therefore, all of these methodologies and resulting structures require, to some extent, modifications to existing compass designs.

SUMMARY OF INVENTION

It is therefore an object of this invention to provide an air bubble free compass and a method of manufacturing the same.

It is a further object of this invention to provide such an air bubble free compass which does not require modifications to existing compass designs.

It is a further object of this invention to provide such an air bubble free compass which can be used at high altitude and/or low temperatures.

It is a further object of this invention to provide such an air bubble free compass which is easy and cost efficient to manufacture.

This invention results from the realization that a standard compass design which includes an expandable diaphragm can be made bubble free at high altitude or low temperature conditions without seriously modifying the design of the compass if the compass is filled with damping fluid at the factory in such a way as to push the expandable diaphragm outward before the compass is sealed causing the diaphragm to exert pressure on the damping fluid so that, at high altitude and/or low temperature conditions, the diaphragm will still exert pressure on the damping fluid thereby preventing the formation of air bubbles in contrast to the situation where the compass is filled with oil and the diaphragm is left in its relaxed state when manufactured. The diaphragm can be expanded outward during the filling operation by using pressure to fill the compass, or by pulling the diaphragm outward during filling and in a sense "overfilling" the diaphragm.

This invention features and may suitably comprise, include, consist essentially of and/or consist of a method of preventing air bubbles in a compass equipped with expansion capability, the method comprising assembling a compass unit with fluid expansion means; over filling the compass unit with fluid thereby expanding the expansion means; and sealing the compass unit while maintaining the fluid expansion means in its expanded state thereby exerting pressure on the fluid for preventing air bubbles in reduced pressure and/or reduced temperature conditions. Overfilling the compass may be accomplished by filling under pressure or otherwise expanding the flexible diaphragm resulting in a greater volume of oil in the compass unit than would occur if the diaphragm were left in its relaxed state during filling.

DISCLOSURE OF PREFERRED EMBODIMENT

Other objects, features and advantages will occur to those skilled in the art from the following description of a preferred embodiment and the accompanying drawings, in which:

FIG. 2 is a schematic cross-sectional view of a prior art compass unit showing the diaphragm expanding outward at high altitudes and/or low temperature conditions which causes air bubbles to be formed in the compass dome;

FIG. 3 is a schematic cross-sectional view of the compass unit manufactured according to the methodology of this invention; and FIG. 4 is a schematic cross-sectional view showing the methodology of filling the compass unit with oil according to this invention.

Figure 1:
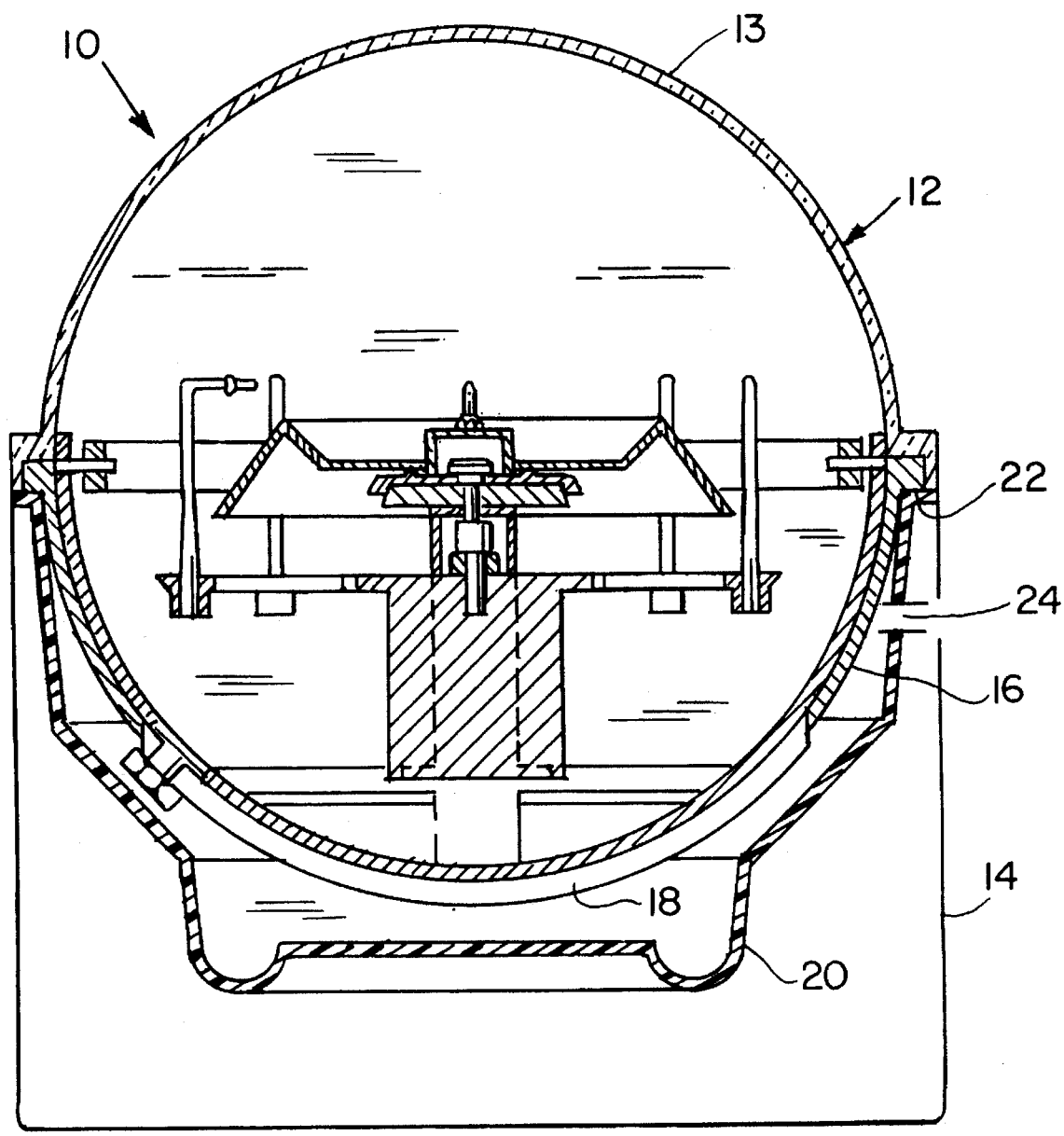
FIG. 1 is a schematic cross-sectional view of a typical compass design.

The primary components of compass 10, FIG. 1 of this invention include compass unit 12 supported in housing 14. Compass unit 12 is an enclosure filled with damping oil and includes upper transparent hemispherical bowl 13 and lower bowl 16. Lower bowl 16 has an elongated slot 18 along its bottom portion enclosed by fluid expansion means such as flexible diaphragm 20 made of neoprene extending from flange 22. Diaphragm 20 has a fill port in lower bowl 16 through which a suitable damping fluid can be introduced into compass unit 12 and air can be evacuated therefrom. Flexible diaphragm 20 permits expansion and contraction of the damping fluid within the compass due to temperature changes, for example when compass 10 is located on the deck of the ship in the hot sun. The other details of compass 10 are adequately discussed in U.S. Pat. No. 4,930,224. Diaphragm 20 typically has an undulating shape or corrugations to make it more flexible.

As discussed in the Background of Invention above, however, filling the compass unit 12 with fluid at the factory may still result in air bubble formation if compass 10 is subjected to low pressures at altitude and/or to reduced temperatures.

Diaphragm 50, FIG. 2 of a typical prior art compass is shown in full line in its relaxed state when compass unit 54 is filled with oil at the time of manufacture. Installed in an aircraft, however, and taken to high altitude where the pressure outside compass unit 54 is reduced results in the volume of compass unit 54 increasing and pushing diaphragm 50 to expand outward as shown in phantom at 50'. Since the volume of oil in housing 54 is a constant, air bubble 60 forms as shown reducing the ability to accurately read the heading shown by the compass. Air bubble formation also occurs when the compass is subjected to low temperature conditions since the oil contracts lowering the pressure inside the compass which again causes absorption of air in the oil to decrease also forming air bubbles at the top of the compass dome. In addition, when the compasses leave the factory and later arrive at the distributor or retailer, some will have air bubbles which results in customer dissatisfaction.

Prior art methodologies of preventing air bubbles required substantial modification to the structure of the compass. In this invention, however, the structural design of the compass is not modified. Instead, standard compass housing 64, FIG. 3, is filled with oil 66 at the time of manufacture in such a way as to cause diaphragm 68 to expand outward as shown at 70. Then, at high altitude, the diaphragm either will not expand or expand very little thereby preventing the formation of air bubbles. The reason appears to be that the diaphragm now exerts pressure on the oil at the time of manufacture and continues to exert some pressure on the oil even at high altitude, low temperature conditions. Since the diaphragm always exerts at least some pressure on the oil, the tendency for air bubbles to form is reduced.

In one embodiment, pressure may be used during the filling operation to expand the diaphragm wherein a source of oil 82, FIG. 4, is pressure fed into chamber 80 resulting in an expanded diaphragm 86 as shown at 90 at the time of manufacture. As an alternative method, if assembly personnel simply pull the undulating diaphragm outward during the filling operation, the result will be an overfilled and expanded diaphragm at the time of manufacture, which will thereafter contiously exert pressure on the oil.

So, although specific features of the invention are shown in some drawings and not others, this is for convenience only as some features may be combined with any or all of the other features in accordance with the invention.

And, other embodiments will occur to those skilled in the art and are within the following claims.

What is claimed is:

1. A method of preventing air bubbles in a compass equipped with fluid expansion capability, the method comprising:

assembling a compass unit with fluid expansion means;

over filling said compass unit with fluid while expanding said fluid expansion means; and sealing said compass unit while maintaining said fluid expansion means in its expanded state thereby exerting pressure on the fluid for preventing air bubbles in reduced pressure and/or reduced temperature conditions.

2. The method of claim 1 in which filling said compass unit includes filling said compass under pressure.

3. The method of claim 1 in which filling said compass unit includes urging said fluid expansion means outward during filling.

4. An improved compass comprising:

a compass housing;

a compass unit filled with damping fluid mounted with said compass housing; and fluid expansion means for sealing said fluid in said compass unit, said fluid expansion means is over expanded when the compass is manufactured and sealed in said condition thereby exerting pressure on said fluid for preventing air bubbles at reduced pressure and/or reduced temperature conditions.

5. The improved compass unit of claim 4 in which said compass unit includes an enclosure sealed on one side by said fluid expansion means, said fluid expansion means comprising a flexible diaphragm.

\* \* \* \* \*